(12) United States Patent
Lee et al.

(10) Patent No.: US 9,866,662 B2
(45) Date of Patent: Jan. 9, 2018

(54) ELECTRONIC DEVICE INCLUDING MICROPHONE AND SPEAKER AND METHOD FOR MANUFACTURING THE SAME

(71) Applicant: Samsung Electronics Co., Ltd., Gyeonggi-do (KR)

(72) Inventors: Gi Hoon Lee, Gyeonggi-do (KR); Hyun Woo Sim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/357,368

(22) Filed: Nov. 21, 2016

(65) Prior Publication Data

US 2017/0149942 A1    May 25, 2017

(30) Foreign Application Priority Data

Nov. 20, 2015    (KR) ........................ 10-2015-0162928

(51) Int. Cl.
```
H04M 1/00      (2006.01)
H04M 1/03      (2006.01)
H04M 1/02      (2006.01)
H04R 1/02      (2006.01)
H04R 1/08      (2006.01)
H04B 1/3888    (2015.01)
```

(52) U.S. Cl.
CPC ............. *H04M 1/03* (2013.01); *H04M 1/026* (2013.01); *H04M 1/0277* (2013.01); *H04R 1/023* (2013.01); *H04R 1/086* (2013.01); *H04B 1/3888* (2013.01); *H04R 2499/11* (2013.01)

(58) Field of Classification Search
CPC ........ H04R 1/02; H04R 1/406; H04R 1/2892; H04R 1/326

USPC ....................... 455/575.1; 381/365, 395, 189
See application file for complete search history.

(56) References Cited

U.S. PATENT DOCUMENTS

| | | | |
|---|---|---|---|
| 8,442,254 B2 | 5/2013 | Yu et al. | |
| 2008/0291647 A1* | 11/2008 | Hirota | H04M 1/026 361/752 |
| 2009/0245565 A1* | 10/2009 | Mittleman | H04M 1/035 381/365 |
| 2010/0080084 A1 | 4/2010 | Chen et al. | |
| 2011/0255726 A1 | 10/2011 | Yu et al. | |

(Continued)

FOREIGN PATENT DOCUMENTS

KR            100758840            9/2007

OTHER PUBLICATIONS

Monster Inc.; "Monster Superstar", XP002769230, Sep. 22, 2015, 4 pages.

(Continued)

*Primary Examiner* — Tu X Nguyen
(74) *Attorney, Agent, or Firm* — The Farrell Law Firm, P.C.

(57) ABSTRACT

An electronic device and a method of manufacturing the electronic device is provided. The electronic device includes a housing, a structure that is formed on a surface of the housing and comprises a first pattern having a first at least one through-hole, a first speaker that is arranged in an interior of the housing to be adjacent to a first portion of the first pattern and is configured to output a sound, and a first microphone that is arranged in the interior of the housing to be adjacent to a second portion of the first pattern and is configured to receive a sound.

18 Claims, 11 Drawing Sheets

(56) References Cited

U.S. PATENT DOCUMENTS

2012/0231778 A1    9/2012  Chen et al.
2014/0071221 A1*   3/2014  Dave ..................... H04M 1/03
                                                         348/14.02
2014/0210675 A1*   7/2014  Hwang .................. H01Q 1/44
                                                         343/702
2016/0219134 A1*   7/2016  Cameron ............. H04R 1/2807

OTHER PUBLICATIONS

European Search Report dated May 2, 2017 issued in counterpart application No. 16197495.1-1914, 8 pages.

* cited by examiner

ELECTRONIC DEVICE INCLUDING MICROPHONE AND SPEAKER AND METHOD FOR MANUFACTURING THE SAME

PRIORITY

This application claims priority under 35 U.S.C. §119(a) to a Korean Patent Application filed on Nov. 20, 2015, in the Korean Intellectual Property Office and assigned Serial No. 10-2015-0162928, the entire disclosure of which is incorporated herein by reference.

BACKGROUND

1. Field of the Disclosure

The present disclosure relates generally to an electronic device, and more particularly to an electronic device including a microphone and a speaker.

2. Description of the Related Art

In recent years, electronic devices, such as smartphones, have been developed to include at least one microphone and at least one speaker (for example, a receiver). Through these, the electronic devices may receive a sound and output a sound to the outside. For example, the microphone of such an electronic device may process a sound introduced through a microphone hole, and the speaker may output a sound through a speaker hole. Also, when a plurality of microphones are provided in the electronic device, the electronic device may determine a direction and a distance of a sound more accurately. Further, when a plurality of microphones are provided in the electronic device, the microphones may be arranged at a specific spacing interval.

The microphone hole and speaker hole, through which sounds may be introduced and discharged from the microphone and the speaker, respectively, may be formed on an outer side of the electronic device (for example, a housing of the electronic device), resulting in an aesthetic disadvantage.

SUMMARY

The present disclosure has been made to address at least the above-mentioned problems and/or disadvantages and to provide at least the advantages described below.

Accordingly, an aspect of the present disclosure is to provide an electronic device that includes a structure, in which holes that are sound passages for at least one microphone and at least one speaker are formed in a single pattern, and a method for manufacturing the same. Because the through-holes are formed in a single pattern, an integral punching area for the microphone and the speaker may be provided.

Accordingly, another aspect of the present disclosure is to provide a method for securing a sealing structure for at least one microphone and/or at least one speaker through a structure that is arranged between the microphone and the speaker and pressed by the microphone and the speaker, and an electronic device that supports the same.

In accordance with an aspect of the present disclosure, an electronic device is provided. The electronic device includes a housing, a structure that is formed on a surface of the housing and comprises a first pattern having a first at least one through-hole, a first speaker that is arranged in an interior of the housing to be adjacent to a first portion of the first pattern and is configured to output a sound, and a first microphone that is arranged in the interior of the housing to be adjacent to a second portion of the first pattern and is configured to receive a sound.

In accordance with another aspect of the present disclosure, a method of manufacturing an electronic device is provided. The method includes mounting at least one speaker and at least one microphone on at least one surface of a bracket arranged inside the electronic device, punching at least one through-hole in a cover layer of the electronic device to form a pattern, and connecting the cover layer that comprises the pattern to the bracket, wherein connecting the cover layer comprises arranging the pattern such that a first portion of the pattern is adjacent to the at least one speaker and a second portion of the pattern is adjacent to the at least one microphone.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
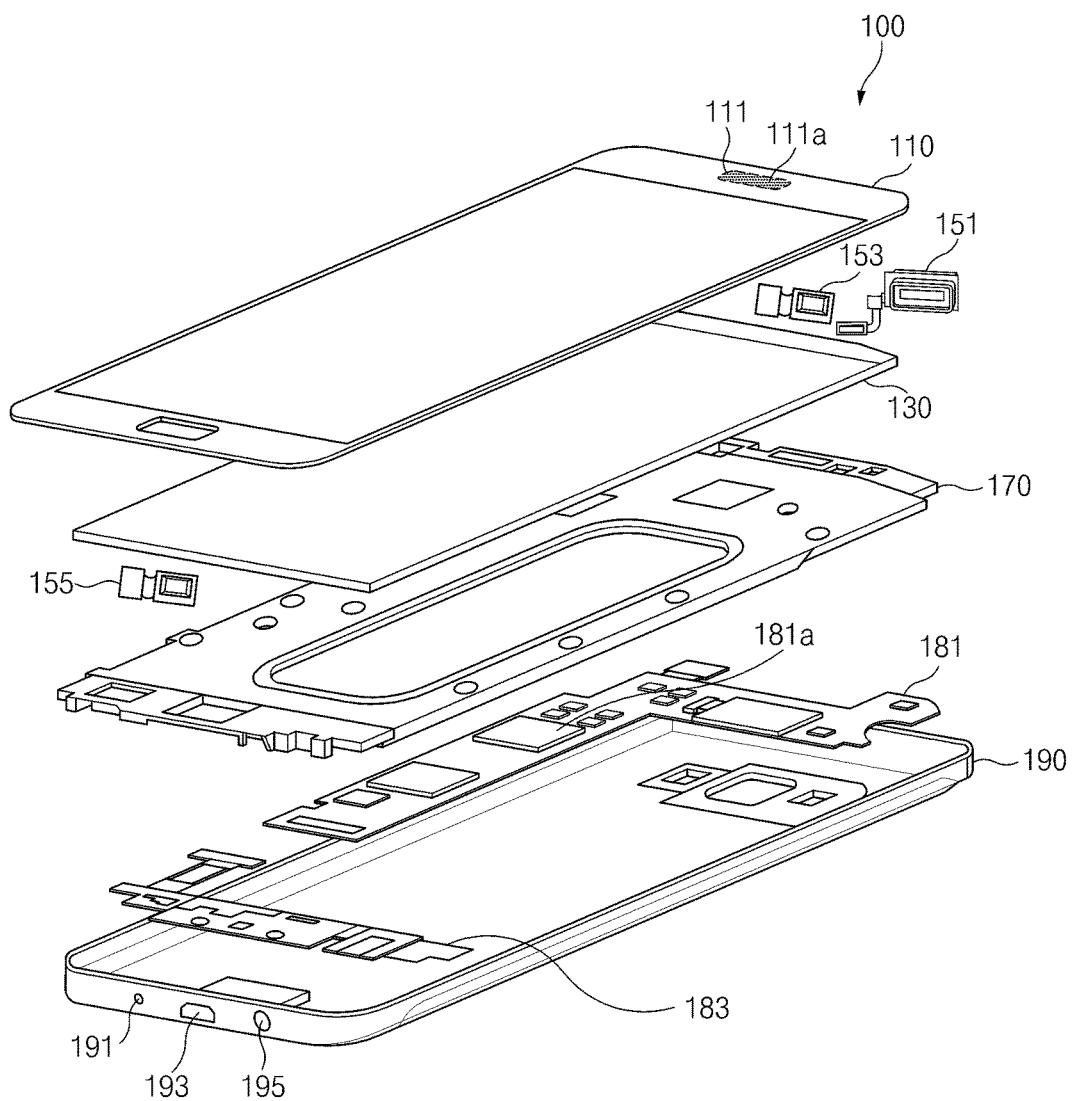
FIG. 1A is an exploded perspective view of components of an electronic device, including a punched front cover, according to an embodiment of the present disclosure.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to their dictionary meanings, but are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," and "have" used herein indicate disclosed functions, operations, or existence of elements but do not exclude other functions, operations or elements.

For example, the expressions "A or B," or "at least one of A and/or B" may include all possible combinations of the items listed. For instance, the expression "A or B" or "at least one of A and/or B" may indicate (1) A, (2) B, or (3) both A and B.

Terms such as "1st," "2nd," "first," "second," and the like used herein may modify various elements regardless of the order and/or importance, but are not intended to limit the elements. For instance, "a first user device" and "a second user device" may indicate different user devices, regardless of order or importance. For example, a first component may be referred to as a second component and vice versa, without departing from the scope and spirit of the present disclosure.

In describing the various embodiments of the present disclosure, it is intended that when a component (for example, a first component) is referred to as being operatively or communicatively "coupled" or "connected" to another component (for example, a second component), the first component may be directly connected to the second component or connected through another component (for example, a third component). It is intended that when a component (for example, a first component) is referred to as being "directly connected" to or "directly accessed" by another component (for example, a second component), another component (for example, a third component) does not exist between the first component and the second component.

The expression "configured to" used in describing various embodiments of the present disclosure may be used interchangeably with the expressions "suitable for," "having the capacity to," "designed to," "adapted to," "made to," or "capable of" according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

The terms used herein are used to describe certain embodiments of the present disclosure, but are not intended to limit the scope of other embodiments. The terms used herein have the same meanings as those which are generally understood by a person skilled in the art to which this disclosure pertains. In general, terms defined in a dictionary should be considered to have the same meanings as the contextual meaning of the related art, and unless clearly defined herein, should not be understood differently or as having an excessively formal meaning. Even terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some embodiments of the present disclosure, an electronic device may be a smart home appliance. The smart home appliance may include at least one of, for example, a television (TV), a digital video/versatile disc (DVD) player, an audio device, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In other embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), an avionics device, a security device, a head unit for a vehicle, an industrial or home robot, an automatic teller machine (ATM), a point of sales (POS) device, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be a combination of the above-mentioned devices. An electronic device may be a flexible device. An electronic device is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1A is an exploded perspective view of components of an electronic device, including a punched front cover, according to an embodiment of the present disclosure.

Referring to FIG. 1A, an electronic device 100 is provided. The electronic device 100 may include a housing that defines an external appearance of the electronic device 100. The housing may include a first surface (for example, a front surface), a second surface (for example, a rear surface) that faces an opposite side of the first surface, and side surfaces that at least partially surround a space between the first surface and the second surface. The first surface may be a front cover 110 and the rear and side surfaces may be a rear cover 190.

The electronic device 100 may further include at least one acoustic component. For example, the electronic device 100 may include at least one microphone, such as, a first microphone 153 and a second microphone 155, and/or at least one speaker 151 (for example, a receiver). The first microphone 153, the second microphone 155, and the speaker 151 are audio input/output devices, and may process a sound that is input and output. Although FIG. 1A illustrates the speaker 151 as a module that is arranged adjacent to the first microphone 153, the present disclosure is not limited thereto. For example, the speaker 151 may be replaced by another module that processes input/output of a sound. Additionally, although FIG. 1A illustrates that the electronic device 100 includes the first microphone 153, the second microphone 155, and the speaker 151, the present disclosure is not limited thereto. According to various embodiments, additional microphones and speakers may be further arranged. For example, a third microphone may be arranged on a rear surface of the housing of the electronic device 100 and a second speaker may be arranged at a lower end of a side surface of the housing of the electronic device 100.

The first microphone 153 and the second microphone 155 may be spaced apart from each other. As the microphones are spaced apart from each other, the electronic device 100 may determine a direction and a distance of a sound source. The microphones 153 and 155 may be arranged at an upper end and a lower end, or on a front surface and a rear surface of the electronic device 100 while forming pairs, and may be arranged within a specific angle (for example, 10 degrees). If a sound is output through the speaker 151 while the first microphone 153 arranged adjacent to the speaker 151 is enabled, the electronic device 100 may disable the first microphone 153 and enable the second microphone 155.

At least one of the microphones 153 and 155 may be a micro electro mechanical system (MEMS) microphone. The MEMS microphone may be provided by mounting a microphone chip (for example, an MEMS transducer) and an application specific integrated circuit (ASIC) chip on a silicon substrate and covering the microphone chip and the ASIC chip with a case (for example, a metal case). The MEMS microphone may be connected to a printed circuit board (for example, a first circuit board 181 or a second circuit board 183). As the microphone chip and the ASIC chip are covered by the case, an acoustic cavity may be formed inside the case. An acoustic hole may be formed in the case such that a sound may be introduced from the outside into the case. The microphone chip may include a vibrational plate and a back plate, and may detect a sound signal introduced through the acoustic hole. The ASIC chip may apply a fixed electric charge to the vibrational plate by using an electric charge pump and may measure a change in voltage that is generated when a capacitance between the vibrational plate moved in response to a sound and the back plate changes. For example, the ASIC chip may convert a sound signal to an electrical signal.

The electronic device 100 may have microphone holes (for example, a second microphone hole 191) at locations corresponding to the microphones 153 and 155, such that a sound may be introduced into the microphones 153 and 155. At least one of the microphones 153 and 155 may be arranged adjacent to at least one other module (for example, the speaker 151) through which a sound needs to be introduced or discharged. When the speaker 151 and at least one of the microphones 153 and 155 are arranged adjacent to each other, the electronic device 100 may have at least one through-hole 111a through which sounds are introduced into and discharged from an area of the front cover 110 (for example, a cover layer or a structure) that covers the speaker 151 and the microphones 153 and 155. For example, an area of the front cover 110 of the electronic device 100 may be punched.

The electronic device 100 may further include a display 130. The display 130 may display various contents (for example, a text, an image, a video, an icon, and a symbol). The display 130 may include a touch screen, and in this case, may receive a touch, a gesture, a proximity, or a hovering input using an electronic pen or the body of the user.

The display 130, the speaker 151, the first microphone 153, and the second microphone 155 may be seated on a specific area of the bracket 170. According to an embodiment, the speaker 151 and/or the microphone 153 may be seated in an upper end area of the bracket 170. As another embodiment, the display 130 may be seated in a central area of the bracket 170, and the second microphone 155 may be seated in a lower end area of the bracket 170. Although FIG. 1A illustrates that the internal modules are seated in the same layer while not overlapping each other, the present disclosure is not limited thereto. According to various embodiments, the internal modules may be seated on the bracket 170 while forming different layers. For example, the display 130 may be positioned on an upper level layer, while the speaker 151, the microphone 153, and/or the second microphone 155 are positioned on one or more lower level layers, and in this case, at least one insulating layer may be positioned between the display 130 and between the speaker 151, the first microphone 153, and the second microphone 155.

The bracket 170 may include an insulating material. Further, a bonding material or a bonding layer may be applied to at least an area of the bracket 170, which the internal modules (for example, the display 130, the speaker 151, the first microphone 153, and the second microphone 155) contact, such that the internal modules may be fixed to the inside of the electronic device 100.

The bracket 170 may include at least one opening. The internal modules may be connected to a circuit board (or a printed circuit board), such as the first circuit board 181 or the second circuit board 183, through the at least one opening formed in the bracket 170. The bracket 170 may have one opening in a central area other than an peripheral area thereof, and the number, the form, or the locations of the openings may be differently determined according to the number, the form, or the locations of the modules, which are connected to the first circuit board 181 or the second circuit board 183, of the internal modules. The bracket 170 may include at least one hole such that at least one of the internal modules may be connected to the outside.

The front cover 110 may be positioned on the bracket 170. The front cover 110 may cover at least some of the internal modules seated on the bracket 170 to protect the internal modules. The front cover 110 may have a size that is the same as or similar to the size of the bracket 170. A bonding material or a bonding layer may be applied to at least an area of the bracket 170, which the front cover 110 contacts, such that the front cover 110 may be fixed to the bracket 170. In some embodiments, the front cover 110 may be attached to or detached from the bracket 170. For example, the front cover 110 may be fixed to the bracket 170 at a point at which the front cover 110 contacts the bracket 130 through a screw member or the like. The front cover 110 may include a transparent material (or a transparent substrate). The front cover 110 may include a glass material. For example, the front cover 110 may include a glass window.

The front cover 110 may include a punched area 111. The punched area 111 may include a single pattern having at least one through-hole 111a. The punched area 111 may be formed on at least one surface of the front cover 110, and may be arranged on the internal modules that require introduction and discharge of sounds. However, the location of the punched area 111 is not limited thereto. The punched area 111 may be formed on at least one the front cover 110, a front or rear surface of the rear cover 190, or a side surface of the rear cover 190 of the electronic device 100.

The plurality of through-holes 111a included in the punched area 110 may have the same hole size (for example, the same diameter) or may have different hole sizes. The plurality of through-holes 111a may have diameters (for example, 300 μm) of a specific size or less. For example, when the diameters of the plurality of through-holes 111a are the specific size or less, the user may not recognize that the plurality of through-holes 111a are formed in the front cover 110. In this case, the sum of the hole sizes of the plurality of through-holes 111a formed in the punched area 110 to secure the performance of the internal modules may be a specific size or more. For example, when each of the plurality of through-holes 111a formed in the punched area 110 have a diameter of 300 μm, a specific number (e.g., 144) or more of the plurality of through-holes 111a may be formed in the punched area 110. As another embodiment, an interval between the plurality of through-holes 110 may be determined not to exceed a specific size.

A material of the punched area 110 may at least partially include a material that is the same as or similar to a peripheral portion of the punched area 110. The punched area 110 may be at least partially coated with the material that is the same as or similar to the peripheral portion of the punched area 110. At least one of the plurality of through-holes 111a may be used as a first microphone hole for the first microphone 153 and at least one thereof may be used as a speaker hole for the speaker 151.

The first circuit board 181 and/or the second circuit board 183 may be situated under the bracket 170. The first circuit board 181 and/or the second circuit board 183 may be seated in a specific area of the bracket 170. An insulating material may be arranged between the area in which the internal modules are seated and the area in which the first circuit board 181 and the second circuit board 183 are seated. The first circuit board 181 and the second circuit board 183 may include a hardware device, such as a control circuit or a processor 181a, which controls the internal modules. The first circuit board 181 and the second circuit board 183 may be integrally formed, and the first circuit board 181 and the second circuit board 183 may be electrically connected to each other.

The rear cover 190 may be arranged under the bracket 170. The rear cover 190 may cover the internal modules, the bracket 170, and the circuit boards 181 and 183 arranged between the front cover 110 and the rear cover 190 from the rear side of the electronic device 100 to protect the components from the outside. A bonding material or a bonding layer may be applied to an area of the rear cover 190, which the bracket 170 or the circuit boards 181 and 183 contact, such that the bracket 170 and the circuit boards 181 and 183 may be fixed to the rear cover 190. In some embodiments, the rear cover 190 may be attached to or detached from the bracket 170.

The rear cover 190 may have a second microphone hole 191 at a location of one surface (for example, a side surface of the rear cover 190) of the electronic device 100, which corresponds to the second microphone 155, such that a sound is introduced into the second microphone 155. The rear cover 190 may further include input/output terminal hole, such as a first input/output terminal hole 193 and a second input/output terminal hole 195, to which external input/output terminals may be connected.

Although some configurations of the electronic device 100 are illustrated in FIG. 1A, the electronic device 100 may further include at least one element, in addition to the above-mentioned elements. For example, the electronic device 100 may further include a battery under the first circuit board 181 and the second circuit board 183.

Figure 1B:
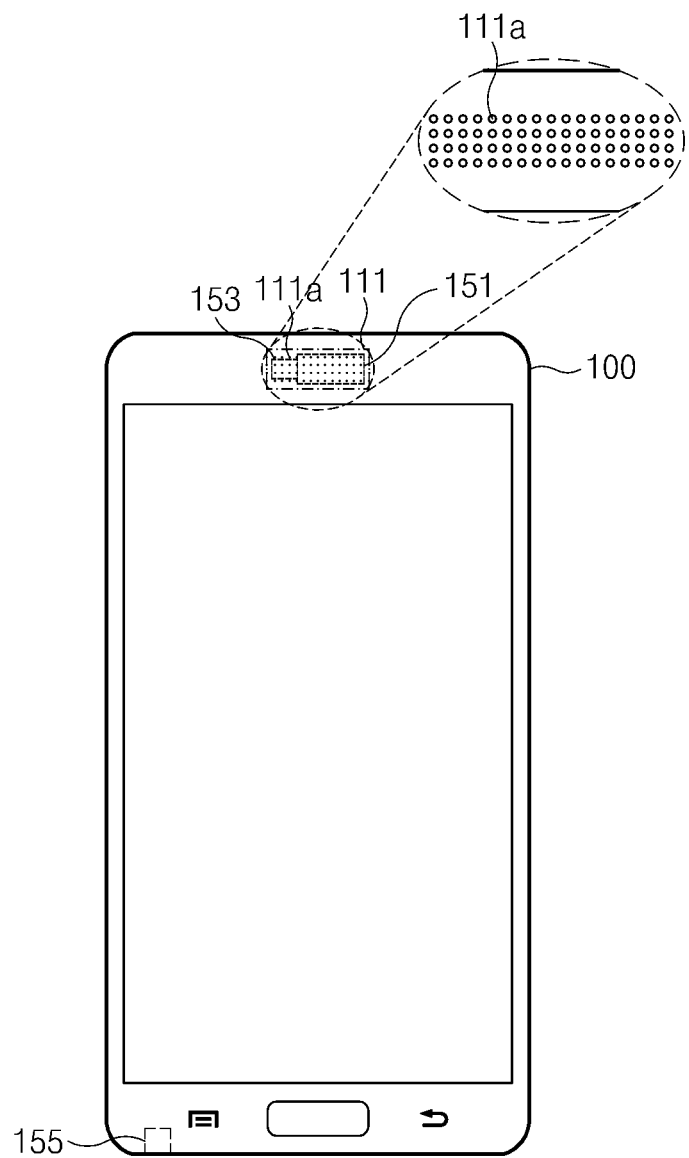
FIG. 1B is a front view of an electronic device, including a punched area of on a front cover of the electronic device, according to an embodiment of the present disclosure.

FIG. 1B is a front view of an electronic device, including a punched area of on a front cover of the electronic device, according to an embodiment of the present disclosure.

Referring to FIG. 1B, the electronic device 100 is shown including the punched area 111 on the front cover 110 of the electronic device 100. The internal modules (for example, the display 130, the receiver 151, the first microphone 153, and the second microphone 155) of the electronic device 100 may be covered by the front cover 110 so as not to be exposed to the outside. A sound may be introduced into at least one of the internal modules or output from the at least one of the internal modules to the outside through holes. A sound may be introduced into or discharged from the speaker 151 and the first microphone 153 through the plurality of through-holes 111a included in the punched area 111 formed at an upper end area of the front cover 110. As another embodiment, a sound may be introduced from the outside into the second microphone 155 through the second microphone hole 191.

At least one portion of the front cover 110 may be chamfered. For example, a peripheral area of the plurality of through-holes 111a formed in the punched area 111 of the front cover 110 may be chamfered.

The first microphone 153 may be a directional microphone that faces the front side of the electronic device 100. The first microphone 153 may be arranged at an upper end of the electronic device 100 to process a sound that is introduced from a side corresponding to an angle in a specific range with respect to the front side of the electronic device 100. The second microphone 155 may be a directional microphone that faces the lower side of the electronic device 100. The second microphone 155 may be arranged at a lower end of the electronic device 100 to process a sound that is introduced from a side corresponding to an angle in a specific range with respect to the lower side of the electronic device 100. The electronic device 100 may measure a direction and a distance of a sound through the first microphone 153 and the second microphone 155. In some embodiments, the electronic device 100 may further include a third microphone.

Figure 1C:
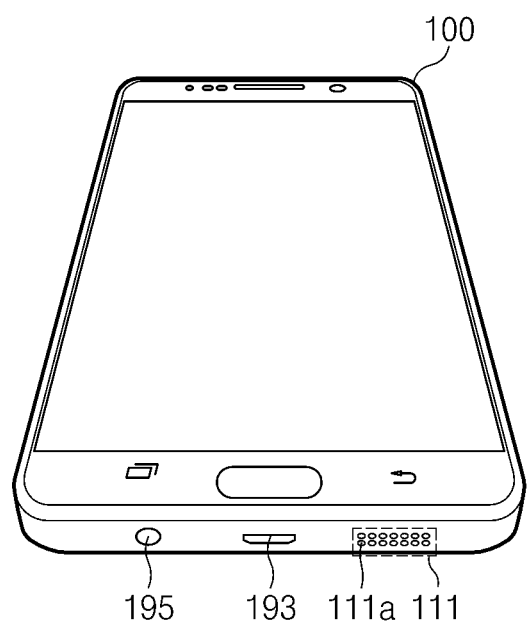
FIG. 1C is a perspective view of an electronic device, including a punched area on a side surface of the electronic device, according to an embodiment of the present disclosure.

FIG. 1C is a perspective view of an electronic device, including a punched area on a side surface of the electronic device, according to an embodiment of the present disclosure.

Referring to FIG. 1C the electronic device 100 is shown including the punched area 111 on a side surface of the rear cover 190 of the electronic device 100. According to various embodiments, the electronic device 100 may include a plurality of punched areas. For example, a first punched area may be formed at an upper end of the front cover 110 as illustrated in FIG. 1B and a second punched area may be formed at a lower end of a side surface of the rear cover 190 as illustrated in FIG. 1C. In this case, a sound related to the first speaker 151 and the first microphone 153 arranged adjacent to the first punched area may be introduced and discharged through the first punched area, and a sound related to the second microphone 155 arranged adjacent to the second punched area may be introduced and discharged through the second punched area. FIG. 1B illustrates that the punched area 111 is formed at a lower end of a side surface of the rear cover 190 to be adjacent to the first input/output terminal hole 193 and the second input/output terminal hole 195 to which an external input/output terminal may be connected.

The punched area 111 may be formed in a metal frame that constitutes a portion of the housing of the electronic device 100. In this case, the punched area 111 may be punched more easily that in the method of punching a punched area in a glass window. As illustrated in FIG. 1B, at least a portion (for example, a side surface) of the rear cover 190 may correspond to the metal frame, and the punched area 111 may be formed in an area (for example, a lower end area) of the metal frame.

Figure 2:
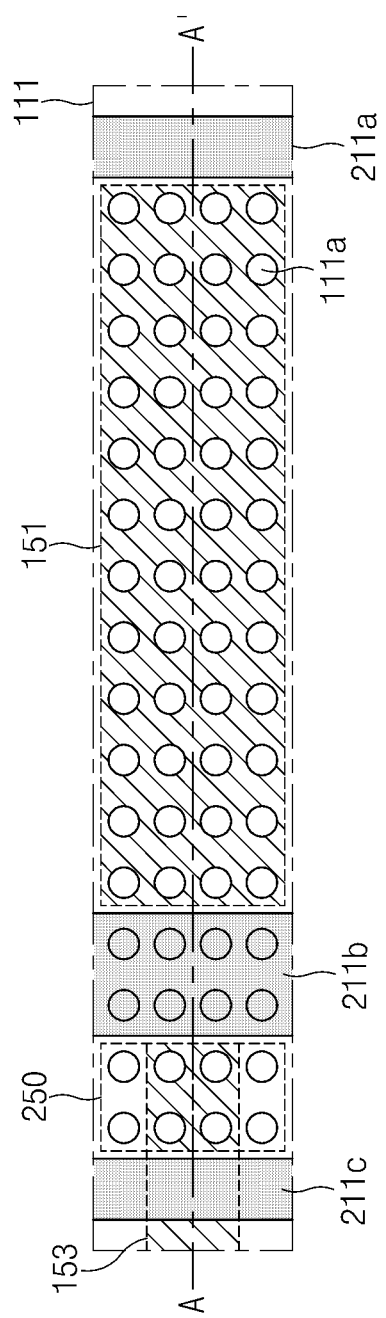
FIG. 2 is a partially enlarged view of a punched area of a front cover of an electronic device, according to an embodiment of the present disclosure.

FIG. 2 is a partially enlarged view of a punched area of a front cover of an electronic device, according to an embodiment of the present disclosure.

Referring to FIG. 2, the punched area 111 of the front cover 110 is shown. The punched area 111 may include the plurality of through-holes 111a. The plurality of through-holes 111a may have diameters of a specific size or less such that the user cannot recognize the existence of the punched area 111. As another embodiment, even though the plurality of through-holes 111a have a specific size or less, the sum of the hole sizes of the plurality of through-holes 111a may have a specific size or more to secure the performance of the internal modules (for example, the speaker 151 and the first microphone 153) according to an amount of introduced and discharged sounds. Accordingly, the number of the plurality of through-holes 111a included in the punched area 111 may be differently determined according to the size of the through-holes 111a. When the each size of the through-holes 111a is a diameter of 300 μm, the punched area 111 may include a specific number (e.g., 144) or more of the plurality of through-holes 111a. The plurality of through-holes 111a may be arranged in a matrix structure to increase efficiency in a limited area. For example, if the total number of the plurality of through-holes 111a included in the punched area is 144, the through-holes 111a may be arranged in a matrix structure of 36 by 4 through-holes. As another embodiment, an interval between each of the plurality of through-holes 111a may be determined not to exceed a specific size.

Structures, such as a partition wall (or a first member) or a sealing member (or a second member), may be arranged between the internal modules to secure a sealing structure. FIG. 2 illustrates that a first sealing member 211a is arranged on the right side of the speaker 151, a second sealing member 211b is arranged between the speaker 151 and the first microphone 153, and a third sealing member 211c is arranged on the left side of the first microphone 153. The location of the second sealing member 211b may be changed to secure the performance of the speaker 151 or the first microphone 153. For example, the second sealing member 211b may be moved to the right side to increase an amount of sounds introduced into the first microphone 153. The location of the second sealing member 211b may be determined such that the sum of the hole size of the holes 111a included in the first microphone hole area 250 may be a specific size or more to secure the performance of the first microphone 153.

At least one structure may be further arranged around an outer side of the internal modules in addition to the structures arranged between the internal modules. For example, at least one of a partition wall or a sealing member may be additionally arranged on an upper or lower surface as well as the left and right surfaces of the speaker 151 or the first microphone 153.

The first sealing member 211a, the second sealing member 211b, or the third sealing member 211c may include a resilient material having a resilient force of a specific magnitude to be pressed to the front cover 110. The first sealing member 211a, the second sealing member 211b, or the third sealing member 211c may include rubber or sponge. A sealing structure of the first microphone 153 may be secured by blocking an introduction and discharge of unnecessary sounds with the first sealing member 211a, the second sealing member 211b, or the third sealing member 211c.

The structure (for example, a partition wall or a sealing member) that is adjacent (or contacts) the punched area 111 may have characteristics (for example, a color) that are the same as or similar to those of a peripheral portion of the punched area 111. For example, a sealing member (for example, the first sealing member 211a, the second sealing member 211b, or the third sealing member 211c) arranged under the punched area 111 may have a color that is the same as or similar to that of the structure (for example, the front cover 110 or the rear cover 190) in which the punched area 111 is formed.

The structure that is in contact with (or adhered to) the plurality of through-holes 111a may include at least one hole that is aligned with the plurality of through-holes 111a and has a form and a width that are the same as or similar to those of the plurality of through-holes 111a. FIG. 2 illustrates a state in which the second sealing member 211b contacts eight of the plurality of through-holes 111a. Accordingly, the second sealing member 211b may include eight holes that have a form and a width that are the same as or similar to those of the plurality of through-holes 111a at a location that is aligned with the eight through-holes.

Figure 3A:
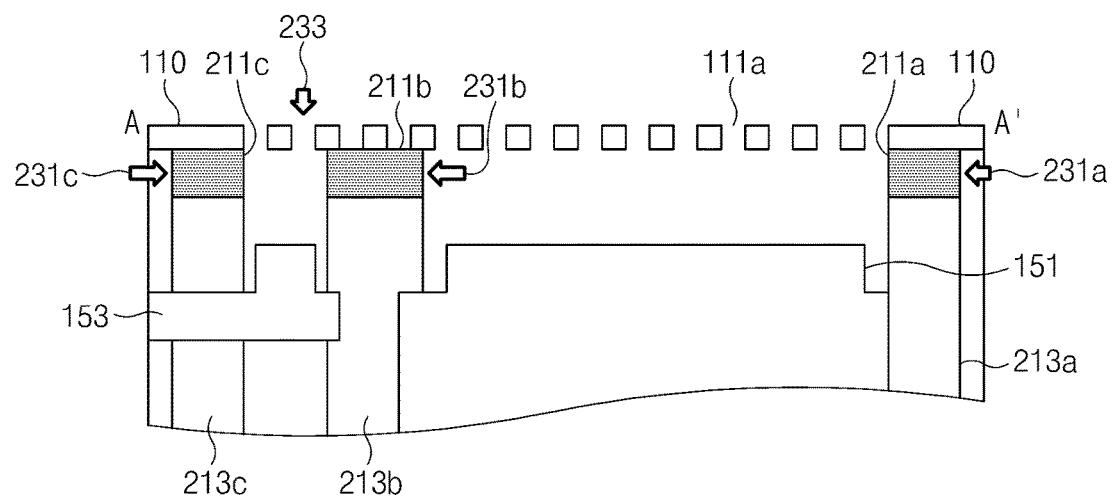
FIG. 3A is a sectional view of a punched area of a front cover of an electronic device, according to an embodiment of the present disclosure.

FIG. 3A is a sectional view of a punched area of a front cover of an electronic device, according to an embodiment of the present disclosure.

Referring to FIG. 3A, a sectional view of the punched area 111 of the front cover 110 in FIG. 2, taken along a line A-A', is shown.

The front cover 110 may include the punched area 111 having a plurality of through-holes 111a for introducing and discharging a sound for the speaker 151 and the first microphone 153 arranged under the front cover 100. The punched area 111 may be formed in the glass window of the front cover 110. One of the plurality of through-holes 111a may be used as the first microphone hole. In relation to processing of the first microphone 153, in order to prevent the introduction of an unnecessary sound (for example, a first ineffective sound 231a, a second ineffective sound 231b, or a third ineffective sound 231c) other than an effective sound 233 that is introduced through the first microphone hole, the first sealing member 211a, the second sealing member 211b, and the third sealing member 211c may be pressed to a lower side of the front cover 110. The first sealing member 211a, the second sealing member 211b, and the third sealing member 211c also may be pressed to the first partition wall 213a, the second partition wall 213b, and the third partition wall 213c, respectively. For example, the first sealing member 211a may be pressed between an upper side of the first partition wall 213a and a lower side of the front cover 110, the second sealing member 211b may be pressed between an upper side of the second partition wall 213b and a lower side of the front cover 110, and the third sealing member 211c may be pressed between an upper side of the third partition wall 213c and a lower side of the front cover 110.

The first partition wall 213a, the second partition wall 213b, and the third partition wall 213c may be parts of the bracket 170 that fixes and supports the internal modules (for example, the display 130, the speaker 151, the first microphone 153, and the second microphone 155) of the electronic device 100. FIG. 3A illustrates that the first partition wall 213a and the second partition wall 213b fix and support the speaker 151, and the second partition wall 213b and the third partition wall 213c fix and support the first microphone 153.

The widths and the thicknesses of the first sealing member 211a, the second sealing member 211b, and the third sealing member 211c arranged on the first partition wall 213a, the second partition wall 213b, and the third partition wall 213c may be differently determined according to the materials of the sealing members, a spacing distance between the sealing members, the sizes of the through-holes 111a, or the material and weight of the front cover 110.

As described above, an electronic device may include a housing, a first internal module that is arranged inside the housing, a second internal module that is arranged adjacent to the first internal module, and a front cover that defines one surface of the housing and includes a plurality of through-holes arranged on the first internal module and the second internal module.

The front cover may include a transparent material.

The diameters of the through-holes may be a specific size or less.

The through-holes may have a matrix structure in which intervals of columns and rows do not exceed a specific size.

The electronic device may further include a bracket in which the first internal module and the second module are seated.

The electronic device may further include a partition wall that defines a portion of the bracket and fixes and supports at least one of the first internal module or the second internal module.

The electronic device may further include at least one sealing member that is situated on the partition wall, and the sealing member may be pressed to a lower side of the front cover.

The sealing member may include at least one of rubber or sponge.

The first internal module is a first microphone and the second internal module may be a speaker.

The electronic device may further include a second microphone that is arranged inside the housing to be spaced apart from the first microphone at a specific spacing distance.

The electronic device may further include at least one partition wall that fixes and supports the first microphone and the speaker.

The electronic device may be configured such that a sealing member may be arranged on a partition wall situated between the first microphone and the receiver, and the sealing member may be pressed to a lower side of the front cover.

Figure 3B:
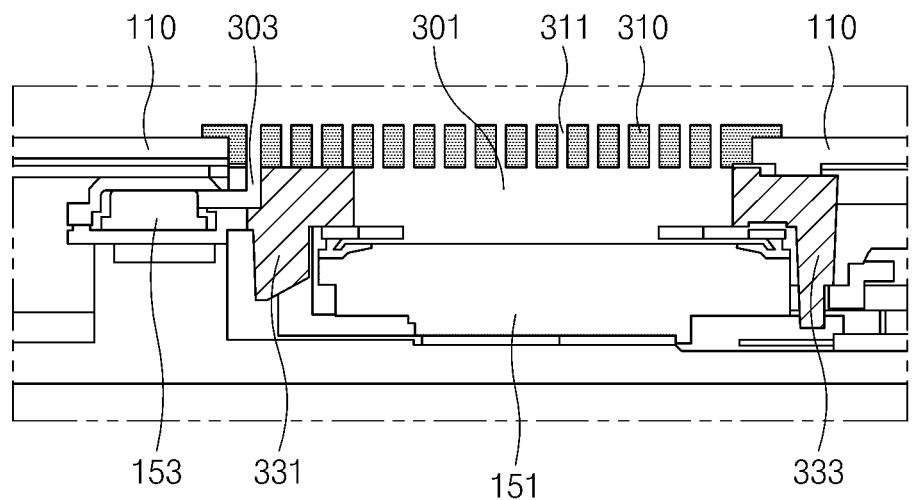
FIG. 3B is a sectional view of a punched area formed on a deco grill of a front cover of an electronic device, according to an embodiment of the present disclosure.

FIG. 3B is a sectional view of a punched area formed on a deco grill of a front cover of an electronic device, according to an embodiment of the present disclosure.

Referring to FIG. 3B, the punched area 111 is shown formed on a deco grill 310 of the front cover 110 of the electronic device 100. The punched area 111 may be formed on the deco grill 310 instead of being formed in the glass window of the front cover 110. The deco grill 310 may be a structure in which at least one through-hole 311 forms a single pattern. The deco grill 310 may be coupled to an opening formed at a portion of the front cover 110 through interference-fitting. The deco grill 310 may be inserted into the opening formed at a portion of the front cover 110 and may be pressed to an upper side of the bracket 170.

The deco grill 310 may be pressed to an upper side of a structure (for example, a partition wall and a sealing member) that fixes and supports the internal modules (for example, the speaker 151 and the first microphone 153). FIG. 3B illustrates that the deco grill 310 is pressed to the upper sides of a first structure 331 and a second structure 333.

The first structure 331 may be arranged between the speaker 151 and the first microphone 153 to fix and support the speaker 151 and to seal a space between the speaker 151 and the first microphone 153.

The second structure 333 may fix and support the speaker 151 and seal a space between the speaker 151 and another module of the bracket 170. Accordingly, the speaker 151 may output a sound through a space (for example, a duct) 301 formed between the first structure 331 and the second structure 333.

The first microphone 153 may be arranged under the deco grill 310, and as illustrated, may be arranged under the front cover 110 to receive a sound through a sound passage 303 connected to the at least one through-hole 311 formed in the deco grill 310.

When the deco grill 310 is pressed to an upper side of a structure, in order to prevent the deco grill 310 from being partially deformed or from coming out, the first structure 331 and the second structure 333 may be arranged to be maximally spaced apart from each other towards opposite corners of the deco grill 310 and a bonding material or a bonding layer may be applied to the upper sides of the first structure 331 and the second structure 333 such that the deco grill 310 may be fixed to the first structure 331 and the second structure 333.

As described above an electronic device may include a housing, a structure that is formed on a surface of the housing and comprises a first pattern having a first at least one through-hole, a first speaker that is arranged in an interior of the housing to be adjacent to a first portion of the first pattern and is configured to output a sound, and a first microphone that is arranged in the interior of the housing to be adjacent to a second portion of the first pattern and is configured to receive a sound.

The structure may include a transparent substrate.

A peripheral area of the first at least one through-hole of the structure is chamfered. The electronic device may further include a second pattern having a second at least one through-hole that passes through the surface on which the first pattern is formed or passes through another surface of the housing, and a second microphone that is arranged in the interior of the housing to be adjacent to the second pattern.

The electronic device may further include a second pattern having a second at least one through-hole that passes through the surface on which the first pattern is formed or passes through another surface of the housing, and a second speaker that is arranged in the interior of the housing to be adjacent to the second pattern.

The electronic device may further include a control circuit that is electrically connected to the first microphone, the first speaker, and the second speaker. The control circuit may be configured to output a voice of a counterpart of a received call using the first speaker when a call is received from an external device, and output a sound based on a signal generated by the electronic device using the second speaker.

The electronic device may further include a first member that is configured to contact at least one of the first speaker and the first microphone to fix at least one of the first speaker and the first microphone to the first member, and a second member that is arranged between the first member and the first pattern.

The second member may be arranged to seal a space between the first member and the first pattern.

At least a portion of the second member may be formed of a material that is less solid than a material of the first member.

The at least a portion of the second member may include at least one of rubber or sponge.

The first pattern may include a plurality of through-holes, and each of the plurality of through-holes are arranged at substantially a same interval.

The plurality of through-holes formed in the first pattern may be arranged in a matrix structure in which intervals between columns and rows of the matrix structure do not exceed a specific size.

The electronic device may further include a first printed circuit board that is arranged between the first surface and the second surface. The first speaker and the first microphone may be arranged on the first printed circuit board.

The electronic device may further include a second printed circuit board that is electrically connected to the first printed circuit board, and a control circuit that is arranged on the second printed circuit board and is electrically connected to the first speaker and the first microphone.

The first at least one through-hole may have a diameter of a specific size or less.

Figure 4:
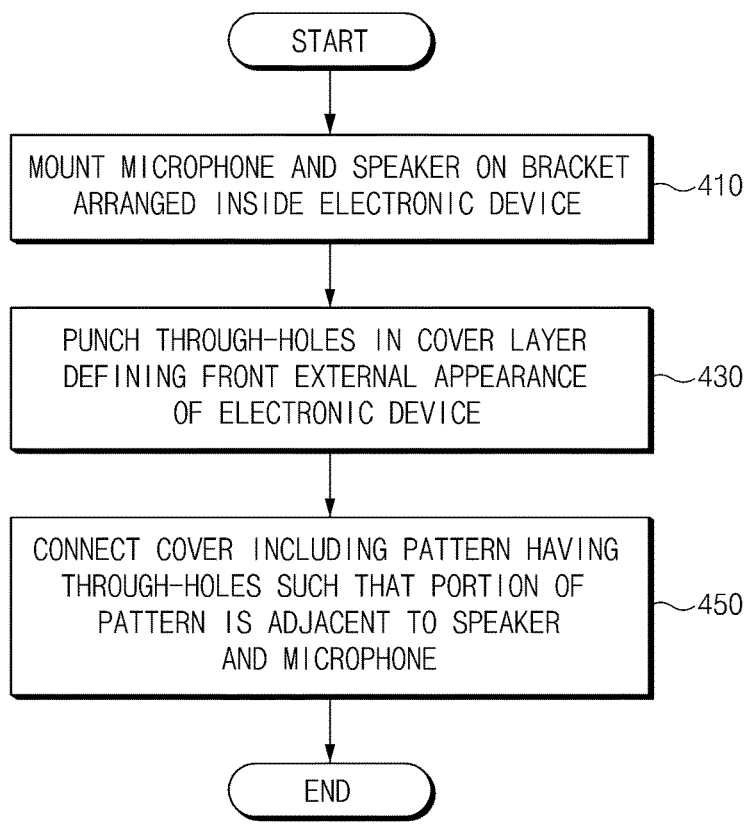
FIG. 4 is a flowchart of a method for manufacturing an electronic device, including a microphone and a speaker, according to an embodiment of the present disclosure.

FIG. 4 is a flowchart of a method for manufacturing an electronic device, including a microphone and a speaker, according to an embodiment of the present disclosure.

Referring to FIG. 4, a method for manufacturing the electronic device 100 is provided. In step 410, the speaker 151 and the first microphone 153 and the second microphone 155 may be mounted on at least one surface of the bracket 170 arranged inside the electronic device 100. The internal modules (for example, the display 130, the speaker 151, the first microphone 153, and the second microphone 155) of the electronic device 100 may be seated in and fixed to the bracket 170. The internal modules may be seated in and fixed to a specific area of the bracket 170. For example, the speaker 151 and the first microphone 153 may be seated in and fixed to an upper end area of the bracket 170, the display 130 may be seated in and fixed to a central area of the bracket 170, and the second microphone 155 may be seated in and fixed to a lower end area of the bracket 170. However, the locations of the internal modules are not limited thereto. Because a bonding material or a bonding layer may be applied to an area of the bracket 170, which the internal modules contact, the internal modules may be fixed to the bracket 170.

In step 430, the plurality of through-holes 111a may be punched in a cover layer (for example, the front cover 110) that defines a front external appearance of the electronic device 100. For example, an area (for example, the upper end area) of the front cover 110 may be punched such that a plurality of through-holes 111a having a diameter of a specific size or less are formed in the area of the front cover 110. If the plurality of through-holes 111a have a diameter of 300 μm, the total number of the plurality of through-holes 111a may be 144, for example, and in this case, may be punched to have a matrix structure of 36 by 4 through-holes, for example. As another embodiment, the area of the front cover 110 may be punched such that an interval between the plurality of through-holes 110 may be determined not to exceed a specific size. Step 430 may be performed prior to step 410.

In step 450, the cover layer including a pattern having the plurality of through-holes 111a may be connected to the bracket 170. The pattern may be arranged such that at least a portion of the pattern is adjacent to the speaker 151 and at least another portion of the pattern is adjacent to the at least one of the microphones 153 and 155 so that the cover layer is connected to the bracket 170. The punched area 111 may be arranged to be situated on at least some (for example, the speaker 151 and the first microphone 153) of the internal modules so that the cover layer (for example, the front cover 110) covers and fixes the bracket 170. Because a bonding material or a bonding layer may be applied to an area of the bracket 170, which the front cover 110 contacts, the front cover 110 may be fixed to the bracket 170. In some embodiments, the front cover 110 may be fixed to the bracket 170 at a point at which the front cover 110 contacts the bracket 130 through a screw member or the like. Accordingly, the front cover 110 may be separated from the bracket 170 through an operation of releasing the screw member.

Prior to step 450, among the structures included in the bracket 170, the sealing members (for example, the first sealing member 211a, the second sealing member 211b, and the third sealing member 211c) may be arranged on the partition walls (for example, the first partition wall 213a, the second partition wall 213b, and the third partition wall 213c) that fix some (for example, the speaker 151 and the first microphone 153) of the internal modules. Through this, in step 450, the sealing members may be pressed between the partition walls and the front cover 110.

The steps described in FIG. 4 are some steps of a manufacturing method for providing corresponding holes (for example, the microphone hole and the speaker hole) to the internal modules that require an introduction and discharge of sounds by punching the front cover 110 (for example, by punching the glass window or through the punched deco grill). However, at least one step other than the above-mentioned steps may be further performed.

As described above, a method of manufacturing an electronic device may include mounting at least one speaker and at least one microphone on at least one surface of a bracket arranged inside the electronic device, punching at least one through-hole in a cover layer of the electronic device to form a pattern, and connecting the cover layer that comprises the pattern to the bracket. The connecting of the cover layer may include arranging the pattern such that a first portion of the pattern is adjacent to the at least one speaker and a second portion of the pattern is adjacent to the at least one microphone.

The punching of the at least one through-hole may include punching the at least one through-hole such that the at least one through-hole has a diameter of a specific size or less.

The punching of the at least one through-hole may include punching the at least one through-hole such that the at least one through-hole is arranged in a matrix form in which intervals between columns and rows of the matrix form do not exceed a specific size.

The method may further include bringing a first member into contact with at least one of the at least one speaker and the at least one microphone to fix the at least one speaker and the at least one microphone with the first member, and arranging a second member between the first member and the pattern.

The method may further include pressing the second member to a lower side of the cover layer such that the second member seals a space between the first member and the pattern.

The method may further include building a partition wall that forms a portion of the bracket and fixes and supports at least one of the internal modules.

The method may further include arranging at least one sealing member on the partition wall and pressing the sealing member to a lower side of the cover layer.

Figure 5A:
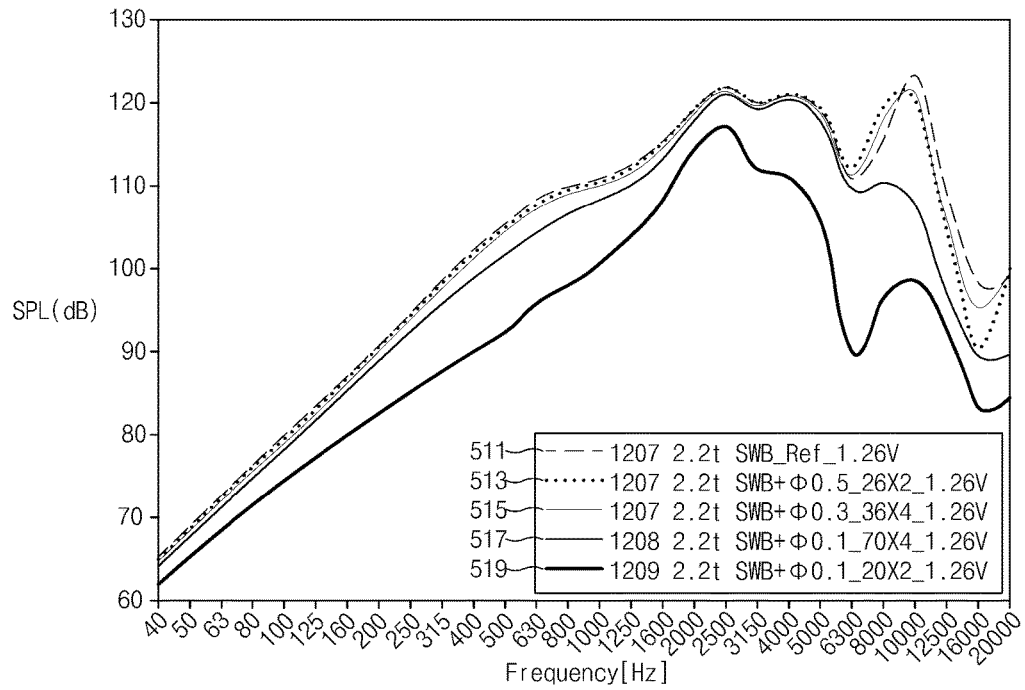
FIGS. 5A and 5B are graphs depicting a microphone performance measurement result according to various punching specifications, according to an embodiment of the present disclosure.
Figure 5B:
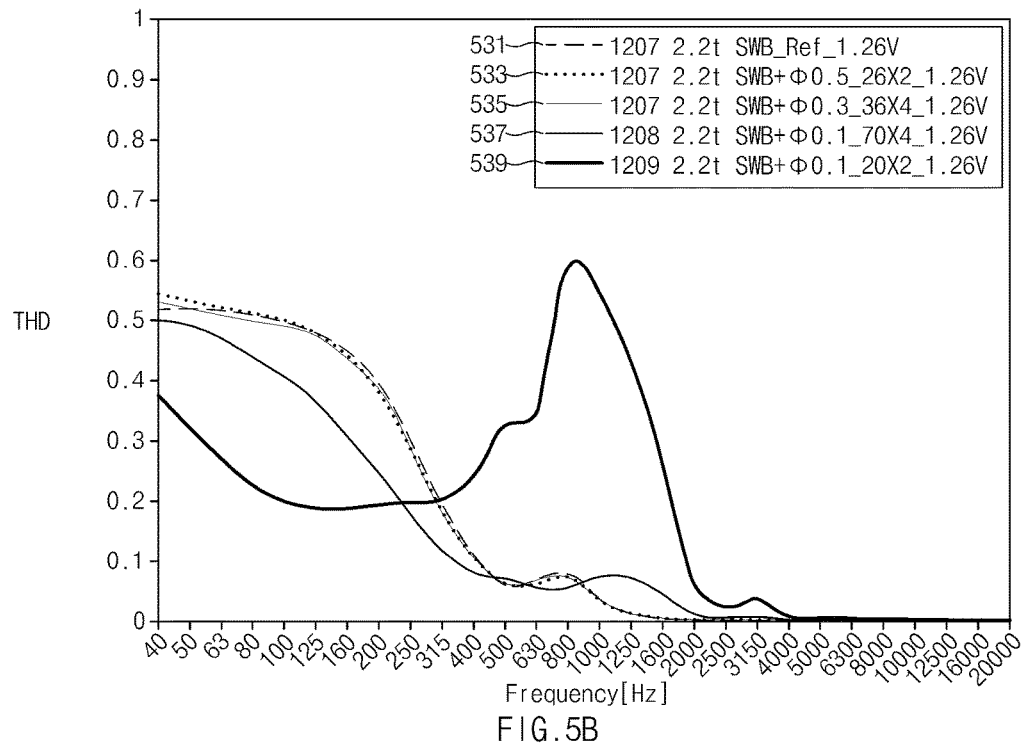

FIGS. 5A and 5B are graphs depicting a microphone performance measurement result according to various punching specifications, according to an embodiment of the present disclosure.

Referring to FIG. 5A a graph obtained by measuring sound pressure levels (SPLs) according to different frequencies is illustrated, and referring to FIG. 5B a graph obtained by measuring total harmonic distortions (THDs) according to the different frequencies is illustrated.

Referring to FIGS. 5A and 5B, the performance of the microphone may be different according to the punching specifications of the front cover 110.

Referring to the SPL graph of FIG. 5A, a punching specification that shows a performance that is closest to a first SPL line 511 that represents an average sound pressure level of the first microphone 153 may be determined. FIG. 5A illustrates that the fifth SPL line 519 shows a low performance as a whole, and the second SPL line 513, the third SPL line 515, and the fourth SPL line 517 shows performance that is similar to that of the first SPL line 511. A punching specification corresponding to the third SPL line 511 that shows a performance that is similar to that of the first SPL line 515 even in a high frequency area may be selected.

Referring to the THD graph of FIG. 5B, a punching specification that shows a performance that is closest to that of the first THD line 531 that represents an average distortion rate of a sound of a microphone may be determined. FIG. 5B illustrates that the fifth SPL line 539 shows a low performance due to the high average distortion rate in an audible frequency band as a whole, and the second SPL line 533, the third SPL line 535, and the fourth SPL line 537 shows performance that is similar to that of the first SPL line 531. A punching specification corresponding to the third THD line 531 that shows a performance that is similar to that of the first THD line 535 even in a low frequency area may be selected.

Based on the graph analysis result of the SPL measurement values and the THD measurement values, when the through-holes having a diameter of 300 μm are arranged to have a matrix structure of 36 by 4 through-holes, it can be identified that an average microphone performance may be obtained.

Figure 6:
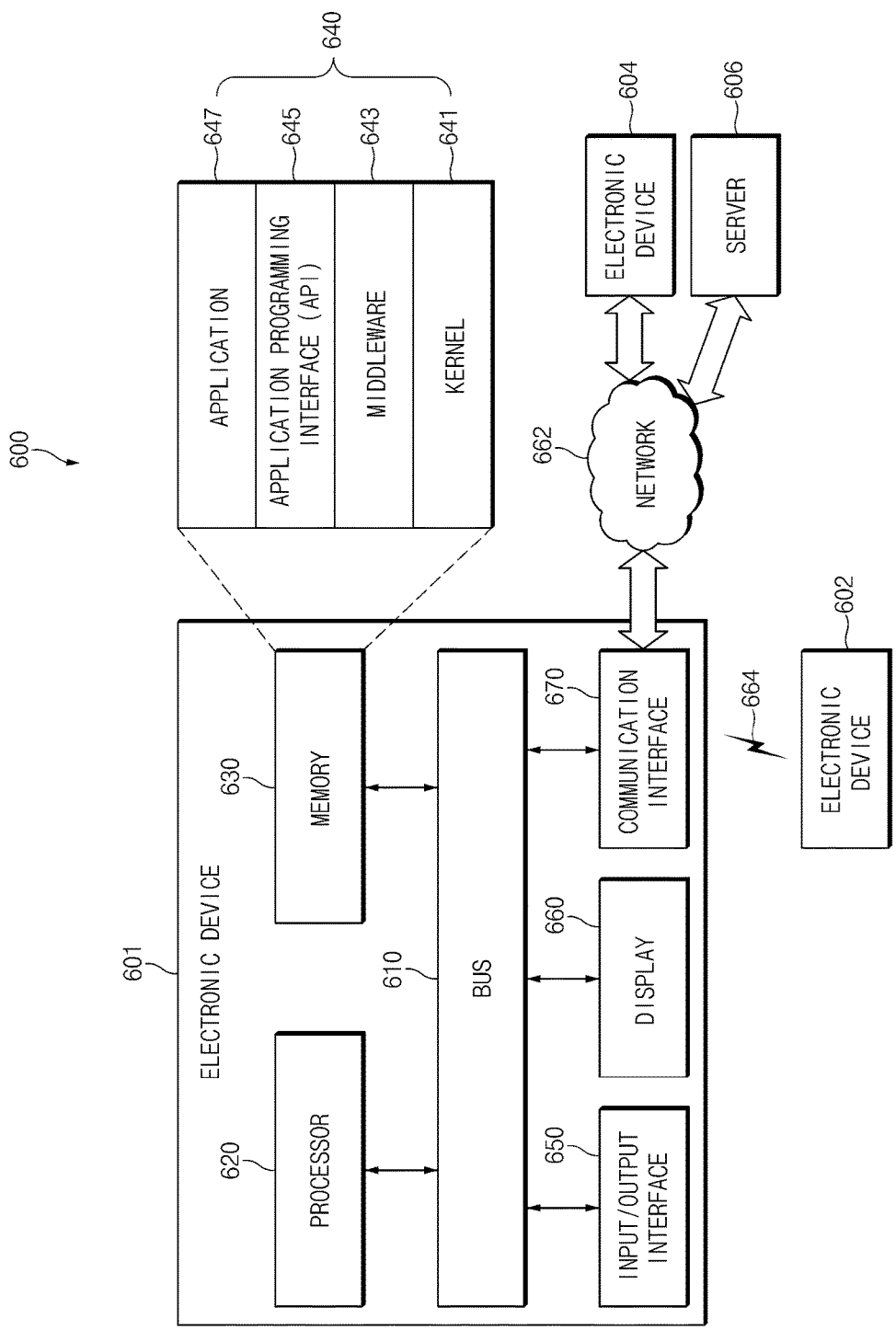
FIG. 6 is a block diagram of a configuration of an electronic device in a network environment, according to an embodiment of the present disclosure.

FIG. 6 is a block diagram of a configuration of an electronic device in a network environment, according to an embodiment of the present disclosure.

Referring to FIG. 6, an electronic device 601 in a network environment 600 is shown. The electronic device 601 may include a bus 610, a processor 620, a memory 630, an input/output interface 650, a display 660, and a communication interface 670. In various embodiments of the present disclosure, at least one of the foregoing elements may be omitted or another element may be added to the electronic device 601.

The bus 610 may include a circuit for connecting the above-mentioned elements 610 to 670 to each other and transferring communications (e.g., control messages and/or data) among the above-mentioned elements.

The processor 620 may include at least one of a central processing unit (CPU), an application processor (AP), or a communication processor (CP). The processor 620 may perform data processing or an operation related to communication and/or control of at least one of the other elements of the electronic device 601.

The memory 630 may include a volatile memory and/or a nonvolatile memory. The memory 630 may store instructions or data related to at least one of the other elements of the electronic device 601. The memory 630 may store software and/or a program 640. The program 640 may include a kernel 641, a middleware 643, an application programming interface (API) 645, and/or an application 647. At least a portion of the kernel 641, the middleware 643, or the API 645 may be referred to as an operating system (OS).

The kernel 641 may control or manage system resources (e.g., the bus 610, the processor 620, the memory 630, or the like) used to perform operations or functions of other programs (e.g., the middleware 643, the API 645, or the application 647). Furthermore, the kernel 641 may provide an interface for allowing the middleware 643, the API 645, or the application 647 to access individual elements of the electronic device 601 in order to control or manage the system resources.

The middleware 643 may serve as an intermediary so that the API 645 or the application 647 communicates and exchanges data with the kernel 641.

Furthermore, the middleware 643 may handle one or more task requests received from the application 647 according to a priority order. For example, the middleware 643 may assign at least one application 647 a priority for using the system resources (e.g., the bus 610, the processor 620, the memory 630, or the like) of the electronic device 601. For example, the middleware 643 may handle the one or more task requests according to the priority assigned to the at least one application 647, thereby performing scheduling or load balancing with respect to the one or more task requests.

The API 645, which is an interface for allowing the application 647 to control a function provided by the kernel 641 or the middleware 643, may include at least one interface or function (e.g., instructions) for file control, window control, image processing, character control, or the like.

The input/output interface 650 may serve to transfer an instruction or data input from a user or another external device to other elements of the electronic device 601. Furthermore, the input/output interface 650 may output instructions or data received from other elements of the electronic device 601 to the user or another external device.

The display 660 may include a liquid crystal display (LCD), a light-emitting diode (LED) display, an organic light-emitting diode (OLED) display, a microelectromechanical systems (MEMS) display, or an electronic paper display. The display 660 may present various content (e.g., a text, an image, a video, an icon, a symbol, or the like) to the user. The display 660 may include a touch screen, and may receive a touch, gesture, proximity or hovering input from an electronic pen or a part of a body of the user.

The communication interface 670 may set communications between the electronic device 601 and an external device (e.g., a first external electronic device 602, a second external electronic device 604, or a server 606). For example, the communication interface 670 may communicate with the first external electronic device 602 via short-range communication 664, and may be connected to a network 662 via wireless communication or wired communication to communicate with the second external electronic device 604 or the server 606.

The wireless communication may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communication may include the short-range communication 664. The short-range communication 664 may include at least one of Wi-Fi, Bluetooth (BT), near field communication (NFC), magnetic stripe transmission (MST), or GNSS.

The MST may generate pulses according to transmission of data and the pulses may generate electromagnetic signals. The electronic device 601 may transmit the electromagnetic signals to a reader device such as a POS device. The POS device may detect the magnetic signals by using a MST reader and restore data by converting the detected electromagnetic signals into electrical signals.

The GNSS may include at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communication may include at least one of universal serial bus (USB), high definition multimedia interface (HDMI), recommended standard 832 (RS-232), plain old telephone service (POTS), or the like.

The network 662 may include at least one of telecommunications networks, for example, a computer network (e.g., local area network (LAN) or wide area network (WAN)), the Internet, or a telephone network.

The types of the first external electronic device 602 and the second external electronic device 604 may be the same as or different from the type of the electronic device 601. The server 606 may include a group of one or more servers. A portion or all of operations performed in the electronic device 601 may be performed in one or more other electronic devices (e.g., the first external electronic device 602, the second external electronic device 604, or the server 606). When the electronic device 601 should perform a certain function or service automatically or in response to a request, the electronic device 601 may request at least a portion of functions related to the function or service from the first external electronic device 602, the second external electronic device 604, or the server 606, instead of or in addition to performing the function or service for itself. The first external electronic device 602, the second external electronic device 604, or the server 606 may perform the requested function or additional function, and may transfer a result of the performance to the electronic device 601. The electronic device 601 may use the received result itself or additionally process the received result to provide the requested function or service. To this end cloud computing technology, distributed computing technology, or client-server computing technology may be used.

Figure 7:
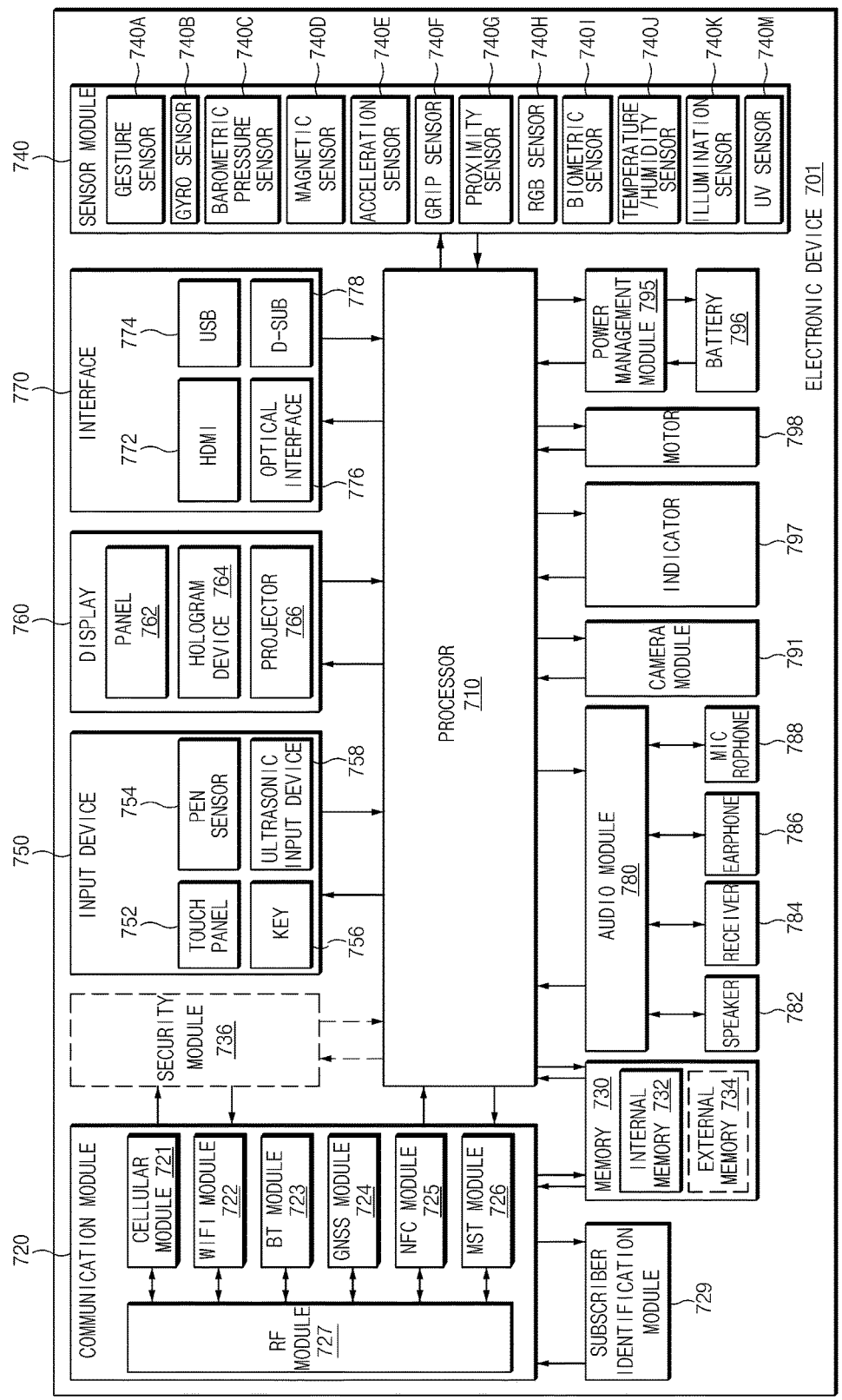
FIG. 7 is a block diagram of a configuration of an electronic device, according to an embodiment of the present disclosure.

FIG. 7 is a block diagram of a configuration of an electronic device, according to an embodiment of the present disclosure.

Referring to FIG. 7, the electronic device 701 may include all or part of an electronic device 601 shown in FIG. 6. The electronic device 701 may include one or more processors 710 (e.g., application processors (APs)), a communication module 720, a subscriber identification module (SIM) 729, a memory 730, a security module 736, a sensor module 740, an input device 750, a display 760, an interface 770, an audio module 780, a camera module 791, a power management module 795, a battery 796, an indicator 797, and a motor 798.

The processor 710 may drive an operating system (OS) or an application program to control a plurality of hardware or software components connected thereto and may process and compute a variety of data. The processor 710 may be implemented with a system on chip (SoC). The processor 710 may include a graphic processing unit (GPU) and/or an image signal processor. The processor 710 may include at least some of the components shown in FIG. 7 (e.g., a cellular module 721). The processor 710 may load a command or data received from at least one of other components (e.g., a non-volatile memory) into a volatile memory to process the data and may store various data in a non-volatile memory.

The communication module 720 may have the same or similar configuration to the communication interface 670 of FIG. 6. The communication module 720 may include the cellular module 721, a Wi-Fi module 722, a BT module 723, a GNSS module 724 (e.g., a GPS module, a Glonass module, a Beidou module, or a Galileo module), a NFC module 725, an MST module 726, and a radio frequency (RF) module 727.

The cellular module 721 may provide a voice call service, a video call service, a text message service, or an Internet service, and the like through a communication network. The cellular module 721 may identify and authenticate the electronic device 701 in a communication network using the SIM 729 (e.g., a SIM card). The cellular module 721 may perform at least part of functions which may be provided by the processor 710. The cellular module 721 may include a communication processor (CP).

The Wi-Fi module 722, the BT module 723, the GNSS module 724, the NFC module 725, or the MST module 726 may include a processor for processing data transmitted and received through the corresponding module. At least some of the cellular module 721, the Wi-Fi module 722, the BT module 723, the GNSS module 724, the NFC module 725, or the MST module 726 may be included in one integrated chip (IC) or one IC package.

The RF module 727 may transmit and receive a communication signal (e.g., an RF signal). Though not shown, the RF module 727 may include a transceiver, a power amplifier module (PAM), a frequency filter, or a low noise amplifier (LNA), or an antenna, and the like. According to another embodiment of the present disclosure, at least one of the cellular module 721, the Wi-Fi module 722, the BT module 723, the GNSS module 724, the NFC module 725, or the MST module 726 may transmit and receive an RF signal through a separate RF module.

The SIM 729 may include a card which includes a SIM and/or an embedded SIM. The SIM 729 may include unique identification information (e.g., an integrated circuit card identifier (ICCID)) or subscriber information (e.g., an international mobile subscriber identity (IMSI)).

The memory 730 (e.g., a memory 630 of FIG. 6) may include an embedded memory 732 or an external memory 734.

The embedded memory 732 may include at least one of a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 734 may include a flash drive a compact flash (CF), a secure digital (SD), a micro-SD, a mini-SD, an extreme digital (xD), a multimedia car (MMC), or a memory stick, and the like. The external memory 734 may operatively and/or physically connect with the electronic device 701 through various interfaces.

The security module 736 may be a module which has a relatively higher security level than the memory 730 and may be a circuit which stores secure data and guarantees a protected execution environment. The security module 736 may be implemented with a separate circuit and may include a separate processor. The security module 736 may include an embedded secure element (eSE) which is present in a removable smart chip or a removable SD card or is embedded in a fixed chip of the electronic device 701. Also, the security module 736 may be driven by an OS different from the OS of the electronic device 701. For example, the security module 736 may operate based on a Java card open platform (JCOP) OS.

The sensor module 740 may measure a physical quantity or may detect an operation state of the electronic device 701, and may convert the measured or detected information to an electric signal. The sensor module 740 may include at least one of a gesture sensor 740A, a gyro sensor 740B, a barometric pressure sensor 740C, a magnetic sensor 740D, an acceleration sensor 740E, a grip sensor 740F, a proximity sensor 740G, a red, green, blue (RGB) sensor 740H, a biometric sensor 740I, a temperature/humidity sensor 740J, an illumination sensor 740K, or an ultraviolet (UV) sensor 740M. Additionally or alternatively, the sensor module 740 may further include an e-nose sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 740 may further include a control circuit for controlling at least one or more sensors included therein. The electronic device 701 may further include a processor configured to control the sensor module 740, as part of the processor 710 or to be independent of the processor 710. While the processor 710 is in a sleep state, the electronic device 701 may control the sensor module 740.

The input device 750 may include a touch panel 752, a (digital) pen sensor 754, a key 756, or an ultrasonic input device 758.

The touch panel 752 may be at least one of a capacitive type, a resistive type, an infrared type, or an ultrasonic type. Also, the touch panel 752 may further include a control circuit. The touch panel 752 may further include a tactile layer and may provide a tactile reaction to a user.

The (digital) pen sensor 754 may be part of the touch panel 752 or may include a separate sheet for recognition.

The key 756 may include a physical button, an optical key, or a keypad.

The ultrasonic input device 758 may allow the electronic device 701 to detect a sound wave using a microphone 788 and to verify data through an input tool generating an ultrasonic signal.

The display 760 (e.g., a display 660 of FIG. 6) may include a panel 762, a hologram device 764, or a projector 766.

The panel 762 may include the same or similar configuration to the display 660. The panel 762 may be implemented to be flexible, transparent, or wearable. The panel 762 and the touch panel 752 may be integrated into one module.

The hologram device 764 may show a stereoscopic image in a space using an interference of light.

The projector 766 may project light onto a screen to display an image. The screen may be positioned inside or outside the electronic device 701. The display 760 may further include a control circuit for controlling the panel 762, the hologram device 764, or the projector 766.

The interface 770 may include a high-definition multimedia interface (HDMI) 772, a universal serial bus (USB) 774, an optical interface 776, or a D-subminiature 778. The interface 770 may be included in the communication interface 670 shown in FIG. 6. Additionally or alternatively, the interface 770 may include a mobile high definition link (MHL) interface, an SD card/multimedia card (MMC) interface, or an infrared data association (IrDA) standard interface.

The audio module 780 may convert a sound and an electric signal bi-directionally. At least part of components of the audio module 780 may be included in the input and output interface 650 (or a user interface) shown in FIG. 6. The audio module 780 may process sound information input or output through a speaker 782, a receiver 784, an earphone 786, or the microphone 788, and the like.

The camera module 791 may be a device which captures a still image and a moving image. The camera module 791 may include one or more image sensors (e.g., a front sensor or a rear sensor), a lens, an image signal processor (ISP), or a flash (e.g., an LED or a xenon lamp).

The power management module 795 may manage power of the electronic device 701. The power management module 795 may include a power management integrated circuit (PMIC), a charger IC or a battery gauge. The PMIC may have a wired charging method and/or a wireless charging method. The wireless charging method may include a magnetic resonance method, a magnetic induction method, or an electromagnetic method, and the like. An additional circuit for wireless charging a coil loop, a resonance circuit, or a rectifier, and the like may be further provided. The battery gauge may measure the remaining capacity of the battery 796 and voltage, current, or temperature thereof while the battery 796 is charged. The battery 796 may include a rechargeable battery or a solar battery.

The indicator 797 may display a specific state of the electronic device 701 or part (e.g., the processor 710) thereof a booting state, a message state, or a charging state, and the like.

The motor 798 may convert an electric signal into mechanical vibration and may generate vibration or a haptic effect, and the like.

The electronic device 701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, a MediaFLO™ standard, and the like.

Each of the above-mentioned elements of the electronic device 701, according to various embodiments of the present disclosure, may be configured with one or more components, and names of the corresponding elements may be changed according to the type of the electronic device. The electronic device 701 may include at least one of the above-mentioned elements, some elements may be omitted from the electronic device 701, or other additional elements may be further included in the electronic device 701. Also, some of the elements of the electronic device 701 may be combined with each other to form one entity, thereby making it possible to perform the functions of the corresponding elements in the same manner as before the combination.

Figure 8:
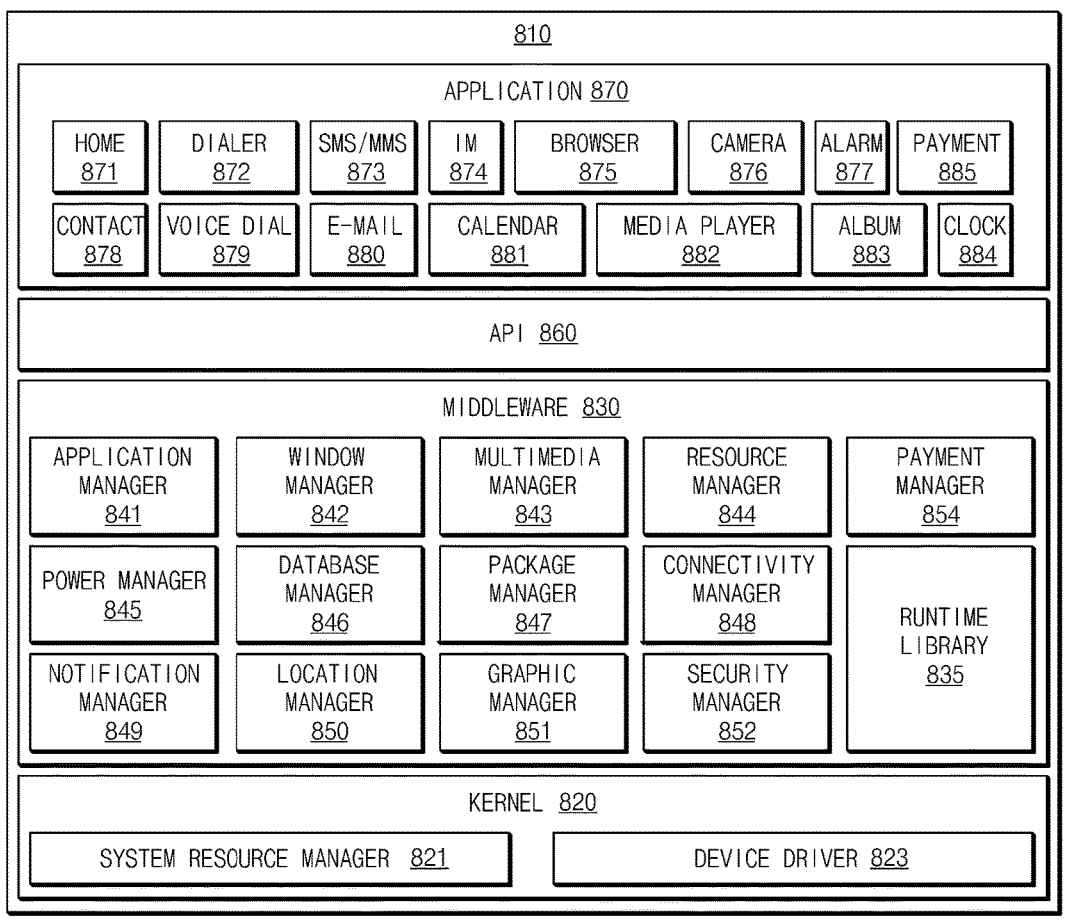
FIG. 8 is a block diagram of a configuration of a program module of an electronic device, according to an embodiment of the present disclosure.

FIG. 8 is a block diagram of a configuration of a program module of an electronic device, according to an embodiment of the present disclosure.

Referring to FIG. 8, a program module 810 is provided. The program module 810 (e.g., a program 640 of FIG. 6) may include an operating system (OS) for controlling resources associated with the electronic device 601 of FIG. 6, and/or various applications (e.g., an application program 647 of FIG. 6) which are executed on the OS. The OS may be Android™, iOS™, Windows™, Symbian™, Tizen™, or Bada™, and the like.

The program module 810 may include a kernel 820, a middleware 830, an application programming interface (API) 860, and/or an application 870. At least part of the program module 810 may be preloaded on the electronic device 601, or may be downloaded from the first external electronic device 602, the second external electronic device 604, or the server 606.

The kernel 820 (e.g., a kernel 641 of FIG. 6) may include a system resource manager 821 and/or a device driver 823. The system resource manager 821 may control, assign, or collect, and the like system resources. The system resource manager 821 may include a process management unit, a memory management unit, or a file system management unit, and the like. The device driver 823 may include a display driver, a camera driver, a BT driver, a shared memory driver, a USB driver, a keypad driver, a Wi-Fi driver, an audio driver, or an inter-process communication (IPC) driver.

The middleware 830 (e.g., a middleware 643 of FIG. 6) may provide functions the application 870 needs in common, and may provide various functions to the application 870 through the API 860 such that the application 870 efficiently uses limited system resources in the electronic device 601. The middleware 830 may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager 854.

The runtime library 835 may include a library module used by a compiler to add a new function through a programming language while the application 870 is executed. The runtime library 835 may perform a function about input and output management, memory management, or an arithmetic function.

The application manager 841 may manage a life cycle of at least one of the application 870.

The window manager 842 may manage graphic user interface (GUI) resources used on a screen of the electronic device 601.

The multimedia manager 843 may determine a format utilized for reproducing various media files and may encode or decode a media file using a codec corresponding to the corresponding format.

The resource manager 844 may manage source codes of at least one of the application 870, and may manage resources of a memory or a storage space, and the like.

The power manager 845 may act together with a basic input/output system (BIOS) and the like, may manage a battery or a power source, and may provide power information utilized for an operation of the electronic device 601.

The database manager 846 may generate, search, or change a database to be used in at least one of the application 870.

The package manager 847 may manage installation or update of an application distributed by a type of a package file.

The connectivity manager 848 may manage a wireless connection such as a Wi-Fi connection, a BT connection, and the like.

The notification manager 849 may display or notify a user of events, such as an arrival message, an appointment, and proximity notification, by a method which is not disturbed to the user.

The location manager 850 may manage location information of the electronic device 601.

The graphic manager 851 may manage a graphic effect to be provided to the user or a user interface (UI) related to the graphic effect.

The security manager 852 may provide all security functions utilized for system security or user authentication, and the like.

According to an embodiment of the present disclosure, when the electronic device 601 has a phone function, the middleware 830 may further include a telephony manager for managing a voice or video communication function of the electronic device.

The middleware 830 may include a middleware module which configures combinations of various functions of the above-described components. The middleware 830 may provide a module which specializes according to kinds of OSs to provide a differentiated function. Also, the middleware 830 may dynamically delete some of old components or may add new components.

The API 860 (e.g., an API 645 of FIG. 6) may be a set of API programming functions, and may be provided with different components according to OSs. For example, in case of Android™ or iOS™, one API set may be provided according to platforms. In case of Tizen™, two or more API sets may be provided according to platforms.

The application 870 (e.g., an application program 647 of FIG. 6) may include one or more of a home application 871, a dialer application 872, a short message service/multimedia message service (SMS/MMS) application 873, an instant message (IM) application 874, a browser application 875, a camera application 876, an alarm application 877, a contact application 878, a voice dial application 879, an e-mail application 880, a calendar application 881, a media player application 882, an album application 883, a clock application 884, a payment application 885, a health care application (e.g., an application for measuring a quantity of exercise, a blood sugar level, and the like), or an environment information application (e.g., an application for providing atmospheric pressure information, humidity information, temperature information, and the like), and the like.

The application 870 may include an information exchange application for exchanging information between the electronic device 601 and the first external electronic device 602 or the second external electronic device 604. The information exchange application may include a notification relay application for transmitting specific information to the external electronic device or a device management application for managing the external electronic device.

The notification relay application may include a function of transmitting notification information, which is generated by other applications (e.g., the SMS/MMS application, the e-mail application, the health care application, the environment information application, and the like) of the electronic device 601, to the first external electronic device 602 or the second external electronic device 604. Also, the notification relay application may receive notification information from the external electronic device 602 or 604, and may provide the received notification information to the user of the electronic device 601.

The device management application may manage (e.g., install, delete, or update) at least one (e.g., a function of turning on/off the external electronic device itself (or partial components) or a function of adjusting brightness (or resolution) of a display) of functions of the first external electronic device 602 or the second external electronic device 604 which communicates with the electronic device, an application which operates in the external electronic device, or a service (e.g., a call service or a message service) provided from the external electronic device.

The application 870 may include an application (e.g., a health care application of a mobile medical device) which is preset according to attributes of the first external electronic device 602 or the second external electronic device 604. The application 870 may include an application received from the server 606, the first external electronic device 602, or the second external electronic device 604. The application 870 may include a preloaded application or a third party application which may be downloaded from a server.

Names of the components of the program module 810 according to various embodiments of the present disclosure may differ according to kinds of OSs.

According to various embodiments of the present disclosure, at least part of the program module 810 may be implemented with software, firmware, hardware, or a combination thereof. At least part of the program module 810 may be implemented (e.g., executed) by the processor 710. At least part of the program module 810 may include a module, a program, a routine, sets of instructions, or a process, and the like for performing one or more functions.

The term "module" used herein may refer to a unit including one of hardware, software and firmware or a combination thereof. The term "module" may be used interchangeably with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) may be implemented as instructions stored in a computer-readable storage medium in the form of a program module. In the case where the instructions are performed by the processor 620, the processor 620 may perform functions corresponding to the instructions. The computer-readable storage medium may be the memory 630.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined, not by the detailed description and embodiments, but by the appended claims and their equivalents.

What is claimed is:
1. An electronic device comprising:
a housing;
a structure that is formed on a surface of the housing and comprises a first pattern having a first at least one through-hole;
a first speaker that is arranged in an interior of the housing to be adjacent to a first portion of the first pattern and is configured to output a sound;
a first microphone that is arranged in the interior of the housing to be adjacent to a second portion of the first pattern and is configured to receive a sound;
a first member that is configured to contact at least one of the first speaker and the first microphone to fix at least one of the first speaker and the first microphone to the first member; and a second member that is arranged between the first member and the first pattern.

2. The electronic device of claim 1, wherein the structure comprises a transparent substrate.

3. The electronic device of claim 1, wherein a peripheral area of the first at least one through-hole of the structure is chamfered.

4. The electronic device of claim 1, further comprising:
a second pattern having a second at least one through-hole that passes through the surface on which the first pattern is formed or passes through another surface of the housing; and
a second microphone that is arranged in the interior of the housing to be adjacent to the second pattern.

5. The electronic device of claim 1, further comprising:
a second pattern having a second at least one through-hole that passes through the surface on which the first pattern is formed or passes through another surface of the housing; and
a second speaker that is arranged in the interior of the housing to be adjacent to the second pattern.

6. The electronic device of claim 5, further comprising:
a control circuit that is electrically connected to the first microphone, the first speaker, and the second speaker, wherein the control circuit is configured to:
when a call is received from an external device, output a voice of a counterpart of the received call using the first speaker, and
output a sound based on a signal generated by the electronic device using the second speaker.

7. The electronic device of claim 1, wherein the second member is arranged to seal a space between the first member and the first pattern.

8. The electronic device of claim 1, wherein at least a portion of the second member is formed of a material that is less solid than a material of the first member.

9. The electronic device of claim 8, wherein the at least a portion of the second member comprises at least one of rubber or sponge.

10. The electronic device of claim 1, wherein the first pattern comprises a plurality of through-holes, and
wherein each of the plurality of through-holes are arranged at substantially a same interval.

11. The electronic device of claim 10, wherein the plurality of through-holes formed in the first pattern are arranged in a matrix structure in which intervals between columns and rows of the matrix structure do not exceed a specific size.

12. The electronic device of claim 1, further comprising:
a first printed circuit board that is arranged between the first surface and the second surface,
wherein the first speaker and the first microphone are arranged on the first printed circuit board.

13. The electronic device of claim 12, further comprising:
a second printed circuit board that is electrically connected to the first printed circuit board; and
a control circuit that is arranged on the second printed circuit board and is electrically connected to the first speaker and the first microphone.

14. The electronic device of claim 1, wherein the first at least one through-hole has a diameter of a specific size or less.

15. A method of manufacturing an electronic device, the method comprising:
mounting at least one speaker and at least one microphone on at least one surface of a bracket arranged inside the electronic device;
punching at least one through-hole in a cover layer of the electronic device to form a pattern;
connecting the cover layer that comprises the pattern to the bracket,
wherein connecting the cover layer comprises arranging the pattern such that a first portion of the pattern is adjacent to the at least one speaker and a second portion of the pattern is adjacent to the at least one microphone;
bringing a first member into contact with at least one of the at least one speaker and the at least one microphone to fix the at least one speaker and the at least one microphone with the first member; and
arranging a second member between the first member and the pattern.

16. The method of claim 15, wherein punching the at least one through-hole comprises:
punching the at least one through-hole such that the at least one through-hole has a diameter of a specific size or less.

17. The method of claim 15, wherein punching the at least one through-hole comprises:
punching the at least one through-hole such that the at least one through-hole is arranged in a matrix form in which intervals between columns and rows of the matrix form do not exceed a specific size.

18. The method of claim 15, further comprising:
pressing the second member to a lower side of the cover layer such that the second member seals a space between the first member and the pattern.

* * * * *